Patented May 23, 1933

1,911,064

UNITED STATES PATENT OFFICE

FRED L. DAMARIN, OF VILLA PARK, AND DONALD A. HARPER, OF CHICAGO, ILLINOIS, ASSIGNORS TO BROWN & CAINE (CHICAGO DIVISION) OF TUNG-SOL LAMP WORKS INC., OF CHICAGO, ILLINOIS, A CORPORATION OF DELAWARE

METHOD OF TREATING IMPREGNATED INSULATING DIELECTRICS

No Drawing. Application filed December 16, 1929. Serial No. 414,583.

Our invention relates to the improvement of the electrical characteristics of impregnated porous insulation by treatment with hot oil, and has for its principal object the production of a new and improved impregnated dielectric which will further withstand high voltages without breakdown due to the crystallization of the impregnating material.

In the manufacture of electrostatic condensers, paper insulated coils, and other similar electrical equipment in which paper, or other similar fibrous materials are used as an insulation, it has long been the practice to improve the dielectric characteristics of that insulating material by impregnating the device in a wax-like substance such as paraffin, hexachlorinated naphthaline, which is commercially known as halowax, teawax and the like.

This treatment improves the insulation greatly but it has been noted that the improvement is only temporary for the reason that the impregnation is not and cannot be made perfect, since the material used in this impregnation is in itself slightly porous and hygroscopic. For example, condensers impregnated in paraffin or halowax will have an excellent insulation resistance and high capacity immediately after they are impregnated, however, if these condensers are allowed to remain under ordinary atmospheric conditions without being protected against the absorption of moisture, the high insulation and dielectric constant of the condenser will soon be destroyed by its absorption of water.

Furthermore condensers of this type, even though protected against the absorption of water, will soon break down if subjected to reasonably high voltages because of the crystallization of the wax or paraffin used to impregnate them due to the vibration of the insulation by the passage of alternating electrical current or pulsating direct current through the device.

It is generally well known among those skilled in the art that impregnating waxes of the type used for the impregnation of paper condensers and other insulating bodies are crystalline in nature and are therefore subject to mixture with other liquids. It is also generally well known that any electrical condenser operating on an alternating current source or a pulsating direct current source, the condenser expands slightly when it is charged and contracts when it is discharged, this movement being purely physical.

The condenser is thus made to vibrate and this vibration materially increases the crystallization of the impregnating wax with the result that that wax is no longer homogeneous and soon breaks down with the resultant destruction of the condenser.

This condition has been recognized heretofore, and attempts made to overcome it, of which we are aware. In certain of these prior art processes, the impregnated condenser is removed from the hot impregnating material, and before it is allowed to cool it is immersed in a bath of cold mineral oil, the theory being that the oil would be forced into the voids and interstices in the impregnation to completely fill them with oil and prevent the device from absorbing moisture.

However, we have found that a condenser treated in this manner is not perfectly impregnated with oil, as might be supposed, since the exterior surfaces of the device are chilled when it is immersed in the cold oil and a shell or crust is formed around the device. This chilling of the exterior surface of the device shrinks that surface, and this shrinkage tends to force the warm impregnating material out of the central portions of the device which are not yet cooled. When those central portions do cool, they tend to shrink away from the outer shell, with the result that an appreciable void is formed into which void the oil does not penetrate.

Condensers treated in this manner are not capable of withstanding excessively high voltages for any length of time, and we have found that the breakdown of these condensers is caused by crystallization of the impregnating compound at or near the center of the condenser. The same is also, of course, true in electrical devices other than condensers that have been treated in this manner.

In our present invention, the impregnated condenser, or other similar electrical device, is allowed to cool down to normal room temperature after being removed from the impregnating bath. The process of impregnation is carried on in the usual manner under vacuum, with the impregnating medium, such as wax or paraffin heated to such a temperature that it will freely flow into and saturate the insulation of the device.

After the condenser has been so impregnated and allowed to cool down to room temperature, we immerse it in a bath of hot liquid oil which may be either a mineral oil, a vegetable oil, or a mixture of mineral and vegetable oils.

The oil bath is maintained at a temperature slightly below the melting point of the material with which the insulation is impregnated. That is, for example, if the condenser is impregnated with hexachlorinated naphthaline, which is commercially known as halowax, which melts at about 215 degrees F., the oil bath will be maintained at a temperature of about 200 degrees F.

By maintaining the oil bath slightly below the melting point of the impregnating compound, that compound is softened somewhat by its immersion in the bath, but it is not melted to the point where it will run freely.

When the cold condenser, or other body, is immersed in the hot oil, the exterior surface of it is heated before the interior surface is heated and, therefore, the exterior surface expands away from the interior surfaces. This expansion creates a vacuum in the body which sucks the oil into the body and makes the oil penetration thereof complete. When the body has heated completely through, the oil will have been drawn into the innermost portions of the body, completely filling the voids in the impregnating compound. These voids, as is well understood by those skilled in the art, are formed during the cooling process after the impregnation of the unit, the formation of voids being present regardless of how slowly the cooling process is carried on. As is well understood, the exterior surfaces of the body will always cool first, and shrink somewhat, tending to force the warmer impregnating compound out from the center of the body. The voids are also formed by the difference in expansion of the metallic plate of the condenser or the wire of a coil, and the paper insulation surrounding these metallic parts when the same are subjected to heat or allowed to cool off. In the case of condensers, voids are also formed because of slight differences in the tension under which the various turns of the condenser are wound during the process of its manufacture.

In carrying out our improved method of saturating the impregnated condenser in oil, we permit it to remain in the warm oil for a predetermined period of time, frequently a matter of hours, so that the penetration of oil into the condenser is complete. This insures that all of the voids will be filled with oil and also that the wax or paraffin used to impregnate the insulation of the unit will absorb all the oil that it possibly can.

This penetration of oil into the unit is facilitated by the expansion of the external surfaces of the unit away from the cooled interior surfaces of the unit which creates a vacuum, and by capillary attraction of the warm oil of the impregnating bath. The oil absorbed by the impregnating compound itself fills the spaces between the crystals of that compound.

This absorption of the oil by the impregnating compound surrounds the crystals of that compound with oil so that when the unit is subsequently subjected to alternating current, the impregnating compound is free to move responsive to the expansion and contraction of the unit as the current is passing through it, and crystallization of the impregnating compound is retarded by this freedom of movement.

In carrying out the impregnating process of our invention we preferably cool the condensers from the working temperature of the oil impregnation to room temperature while they are immersed in the oil. This is accomplished by cooling the oil bath to room temperature slowly, and we have found that by following this procedure we are able to materially reduce the wax strains in the condenser. When the oil and condensers contained therein are cool, the condensers are removed and drained, this operation being possible since the oil used is liquid at this temperature.

In actual tests of condensers impregnated in accordance with the teachings of our invention, voltages in excess of the rated voltage have been applied to a condenser for a long period of time, and similarly applied to condensers which were identical except for the oil impregnation.

The latter condenser showed a decided increase in crystallization of the dielectric, while the condensers impregnated in oil, in accordance with the teachings of our invention, showed only a slight increase in crystallization. The increase in crystallization of both of these condensers was compared to the crystallization of a condenser built at the same time but not subjected to any voltage, the crystalline structure of the impregnating compound of the unit being clearly discernible under a powerful microscope.

The complete saturation of the impregnating medium of the condenser by the oil impregnating process of our invention, is further evidenced by a decrease in the dielectric constant of the condenser. For example, in a halowax condenser, halowax is known to have a dielectric constant of 4. The oil which we use as an impregnating medium is known to have a dielectric constant substantially lower, generally about 2. A condenser treated in accordance with the teachings of our invention has a dielectric constant of approximately 3, indicating that the higher dielectric constant of the wax has been lowered by the absorption of the low dielectric constant oil by that wax. This decrease in the dielectric constant of the insulation of the condenser of course is slightly disadvantageous and necessitates that a slightly larger plate area be used to obtain a particular capacitance, however, we have found that the advantage gained by improvement in the life of the condenser more than offsets the disadvantage caused by the reduction of the dielectric constant of the material.

In our copending application, Serial No. 414,584 filed Dec. 16, 1929 now Patent 1,839,868, issued Jan. 5, 1932, we disclose a method of securing perfect oil impregnation of the dielectric of the condenser without materially lowering the dielectric constant of the same, reference being here made to that application for the details of this process.

Throughout the specification, we have referred to condensers as the device upon which the process is being exercised, it being understood that that reference is made for convenience sake only, since the process may be applied to any electrical device employing paper or any other fibrous insulating material which is impregnated in a wax-like substance that becomes rigid at ordinary room temperatures.

Having thus complied with the statutes and described a preferred embodiment of our invention, what we consider new and desire to have protected by Letters Patent is pointed out in the appended claims.

What is claimed is:—

1. The method of moisture proofing and improving the dielectric properties of porous insulating material which includes the following steps, viz., impregnating the material in a hot wax-like substance, cooling the material to a temperature low enough to permit that substance to solidify, raising the temperature of a bath of liquid oil above room temperature, immersing the material in the heated oil, allowing the temperature of the oil and material to fall, and removing and draining the material.

2. The method of moisture proofing and improving the dielectric properties of porous insulating material which includes the following steps, viz., impregnating the material in a hot wax-like substance, cooling the material to a temperature low enough to permit that substance to solidify, raising the temperature of a bath of liquid oil to a point just below the melting point of said substance, immersing the material in that bath, allowing that temperature to fall, and removing and draining the material.

3. The method of moisture proofing and improving the dielectric properties of porous insulating material which includes the following steps, viz., impregnating the material in a hot wax-like substance, cooling the material to a temperature low enough to permit that substance to solidify, raising the temperature of a bath of liquid oil, immersing the material in that bath, soaking the material therein for a definite time while the liquid is maintained under a definite pressure, allowing the temperature of the bath to fall, and removing and draining the material.

4. The method of moisture proofing and improving the dielectric properties of porous insulating material which includes the following steps, viz., impregnating the material in a hot wax-like substance, cooling the material to room temperature to permit that substance to solidify, raising the temperature of a bath of oil of high dielectric strength to a value just below the melting point of said substance, immersing the impregnated material in said bath, soaking the material in said heated oil for a definite time under vacuum, lowering the temperature of the bath to substantially room temperature, removing the material and draining it.

5. The method of filling voids and interstices of a wax impregnated paper insulated electrical device which comprises immersing the cold impregnated device in a heated bath of liquid oil to expand it and permit capillary attraction to draw the oil into the voids and interstices in the device.

6. The method of filling voids and interstices of a wax impregnated paper insulated electrical device which comprises heating the cold impregnated device in a bath of hot liquid oil to expand it and permit capillary attraction to draw the oil into the voids and interstices in the device and soaking the device in that heated oil for a predetermined time to permit the oil to be absorbed by the wax to surround the crystals in the wax.

7. The method of securing free motion of the crystals of a wax impregnated device which comprises surrounding the crystals with oil by immersing the cold impregnated body in a bath of hot liquid oil.

8. The method of preventing further crystallization of the crystalline wax impregnation of a condenser which comprises surrounding the wax crystals with oil by soaking the cold condenser in hot oil to thereby permit free movement of the wax during operation of the condenser.

9. The method of filling voids and interstices of a wax impregnated paper insulated electrical device which comprises immersing the cold impregnated device in a heated bath of liquid oil to expand its exterior surfaces away from its interior surfaces thereby creating a vacuum in the device which draws the oil into the voids and interstices in the device.

10. The method of filling voids and interstices of a wax impregnated paper insulated electric device which comprises immersing the cold impregnated device in a heated bath of liquid oil to expand its exterior surfaces away from its interior surfaces thereby creating a vacuum in the device which draws the oil into the device and aids the capillary attraction of the wax for the oil in drawing the oil into the voids and interstices in the device.

In witness whereof, we hereunto subscribe our names this thirteenth day of December, 1929.

FRED L. DAMARIN.
DONALD A. HARPER.